(12) United States Patent
Sinha et al.

(10) Patent No.: US 7,608,351 B2
(45) Date of Patent: Oct. 27, 2009

(54) SYSTEM AND METHOD FOR CONTROLLING CATHODE STOICHIOMETRY TO MINIMIZE RH EXCURSIONS DURING TRANSIENTS

(75) Inventors: Manish Sinha, Pittsford, NY (US); David A. Arthur, Honeoye Falls, NY (US); Matthew K. Hortop, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 729 days.

(21) Appl. No.: 11/245,755

(22) Filed: Oct. 7, 2005

(65) Prior Publication Data

US 2007/0082235 A1    Apr. 12, 2007

(51) Int. Cl.
*H01M 8/04*    (2006.01)
(52) U.S. Cl. .............................. 429/13; 429/23; 429/34
(58) Field of Classification Search .................... 429/13, 429/23
See application file for complete search history.

(56) References Cited

U.S. PATENT DOCUMENTS 6,697,745 B2 *   2/2004   Jones et al. .................... 702/60
2005/0214602 A1 *   9/2005   Sinha et al. .................... 429/22

* cited by examiner

*Primary Examiner*—Patrick Ryan
*Assistant Examiner*—Ashley Kwon
(74) *Attorney, Agent, or Firm*—John A. Miller; Miller IP Group, PLC

(57) ABSTRACT

A system and method for providing dynamic cathode stoichiometry control in a fuel cell during stack load transients to minimize relative humidity excursions. Particularly, changes in the cathode stoichiometry is controlled as a function of time in response to a decrease or increase in stack current density. Thus, if the stack current density drops to a predetermined current density, the dynamic stoichiometry logic will monitor the low power condition and determine if the condition is sustained, i.e., for an extended period of time. If the low power condition is not sustained, then the cathode stoichiometry does not change, but if it is sustained, then the cathode stoichiometry is increased. The same delay in changing the cathode stoichiometry can be provided for a transition from a low power condition to a high power condition.

19 Claims, 2 Drawing Sheets

SYSTEM AND METHOD FOR CONTROLLING CATHODE STOICHIOMETRY TO MINIMIZE RH EXCURSIONS DURING TRANSIENTS

BACKGROUND OF THE INVENTION

1. Field of the Invention

This invention relates generally to a system and method for controlling the cathode stoichiometry in a fuel cell and, more particularly, to a system and method for controlling the cathode stoichiometry in a fuel cell that includes maintaining the cathode stoichiometry applicable for high fuel cell power for a predetermined period of time after transitioning to low fuel cell power and maintaining the cathode stoichiometry applicable for low fuel cell power for a predetermined period of time after transitioning to high fuel cell power so as to reduce relative humidity excursions.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). The membranes within a fuel cell need to have a certain relative humidity, such as 80%, so that the ionic resistance across the membrane is low enough to effectively conduct protons.

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode reactant gas flow channels are provided on the anode side of the bipolar plates that allow the anode gas to flow to the anode side of the MEA. Cathode reactant gas flow channels are provided on the cathode side of the bipolar plates that allow the cathode gas to flow to the cathode side of the MEA. The bipolar plates also include flow channels through which a cooling fluid flows.

Cathode stoichiometry is directly proportional to the ratio of the volume of cathode input air applied to the stack to the current density generated by the stack. A typical cathode stoichiometry is about 2 for relatively high fuel cell stack current densities. When the output of the stack goes to low power, such as during an idle condition, it is known in the art to increase the cathode stoichiometry so that the fuel cell stack remains stable. Particularly, accumulation of water within the reactant gas flow channels from water by-product could cause the cells to fail because of low reactant gas flow, and thus affect the stack stability. A voltage cell potential less than 100 mV is considered a cell failure. The volume and rate of input air for the cathode stoichiometry for normal fuel cell operation at low stack loads is not great enough to force the water out of the reactant gas flow channels. Thus, the cathode stoichiometry is sometimes increased at low stack power to increase the airflow and hence stack stability. Consequently, the operating temperature of the fuel cell stack needs to be decreased when the cathode stoichiometry is increased to reduce the membrane drying effect from the increased airflow to maintain a desired membrane relative humidity.

FIG. 1 is a graph with stack current density on the horizontal axis, cathode stoichiometry on the left vertical axis and temperature on the right vertical axis showing the relationship between stack power, cathode stoichiometry and fuel cell temperature discussed above. Graph line 10 shows the relationship between cathode stoichiometry and stack current density and graph line 12 shows the relationship between stack temperature and stack current density. From a stack perspective, a sustained low power stoichiometry of about 1.8 causes instability as a result of water accumulation in the reactant gas flow channels, and an increased stoichiometry to 4 or 5 results in better stability. Consequently, to maintain a desirable membrane relative humidity, the operating temperature of the stack needs to be reduced. From a system perspective, it is difficult to maintain elevated temperatures at sustained low power due to heat losses.

As discussed above, in some known fuel cell systems, as the cathode stoichiometry increases, the controller reduces the temperature of the stack. However, the temperature response time is limited by slow thermal dynamics relative to the change in stoichiometry. In other words, the temperature does not reduce fast enough. This mismatch in thermal dynamics causes the relative humidity of the membrane to be reduced to about 50%. Similarly, as the load increases and the cathode stoichiometry is reduced, the stack temperature is increased. However, the mismatch between airflow and thermal dynamics causes the relative humidity to increase beyond 120% and decay back to the desired 80% when the temperature responds. Thus, unwanted relative humidity excursions occur at load transients.

SUMMARY OF THE INVENTION

In accordance with the teachings of the present invention, a system and method are disclosed for providing dynamic cathode stoichiometry control in a fuel cell during stack load transients. Particularly, changes in the cathode stoichiometry is controlled as a function of time in response to a decrease or increase in stack current density. Thus, if the stack current density drops to a predetermined current density, the dynamic stoichiometry logic will monitor the low power condition and determine if the condition is sustained, i.e., for an extended period of time. If the low power condition is not sustained, then the cathode stoichiometry is not reduced, but if it is sustained, then the cathode stoichiometry is increased. The same delay in changing the cathode stoichiometry can be provided for a transition from a low power condition to a high power condition.

DETAILED DESCRIPTION OF THE EMBODIMENTS

The following discussion of the embodiments of the invention directed to a method for dynamically controlling the cathode stoichiometry of a fuel cell system is merely exemplary in nature, and is in no way intended to limit the invention or its applications or uses.

Figure 1:
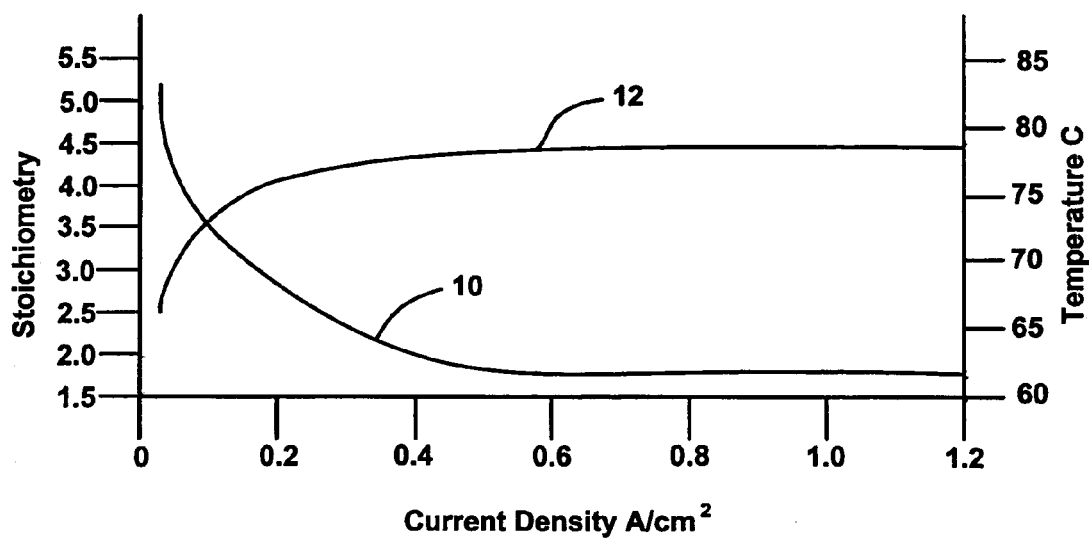
FIG. 1 is a graph with current density on the horizontal axis and cathode stoichiometry and temperature on the vertical axes showing cathode stoichiometry and stack temperature relative to current density for a known fuel cell system.
Figure 2:
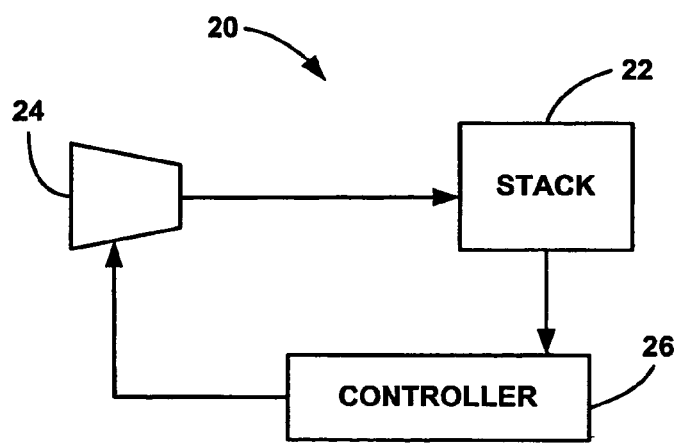
FIG. 2 is a block diagram of a fuel cell system including a compressor and a controller for controlling cathode stoichiometry, according to an embodiment of the present invention.

FIG. 2 is a simplified block diagram of a fuel cell system 20 including a fuel cell stack 22, a controller 26 and a compressor 24. The compressor 24 supplies air flow to the input of the cathode side of the stack 22. As will be discussed in detail below, the controller 26 monitors the current density generated by the stack 22, and controls the speed of the compressor 24 to set the desired cathode stoichiometry for the particular operating condition of the stack 22. Particularly, the controller 26 controls the cathode stoichiometry of the stack 22 in a dynamic manner based on the current density generated by the stack 22 and time to reduce significant relative humidity changes of the membranes in the stack 22.

According to the invention, the controller 26 controls the cathode stoichiometry of the stack 22 to maintain the desired relative humidity for as long as possible. Particularly, changes in the cathode stoichiometry are only made after a change in the stack load is sustained for a predetermined period of time. As discussed above, if the stack 22 is at sustained low power, the cathode stoichiometry needs to be increased to prevent water accumulation in the flow channels that might otherwise affect stack stability. However, when the cathode stoichiometry is increased at low stack load, the relative humidity decreases because the increased airflow dries the membrane. If the operating temperature of the stack is decreased to reduce membrane drying and maintain the desired relative humidity, the relative humidity still changes because of the slow response of the temperature change.

Accumulation of water in the flow channels does not occur immediately at low stack loads. Thus, for short periods of low stack load, the present invention proposes maintaining the cathode stoichiometry the same as for the high stack load to reduce relative humidity excursions of the membrane because the accumulation of water in the flow channels will not be fast enough to affect the stack stability. Note that this is different from using a lag filter for stoichiometry. A lag filter will change the stoichiometry instantaneously, where the algorithm for the present invention will "forget" short-lived transients.

Figure 3:
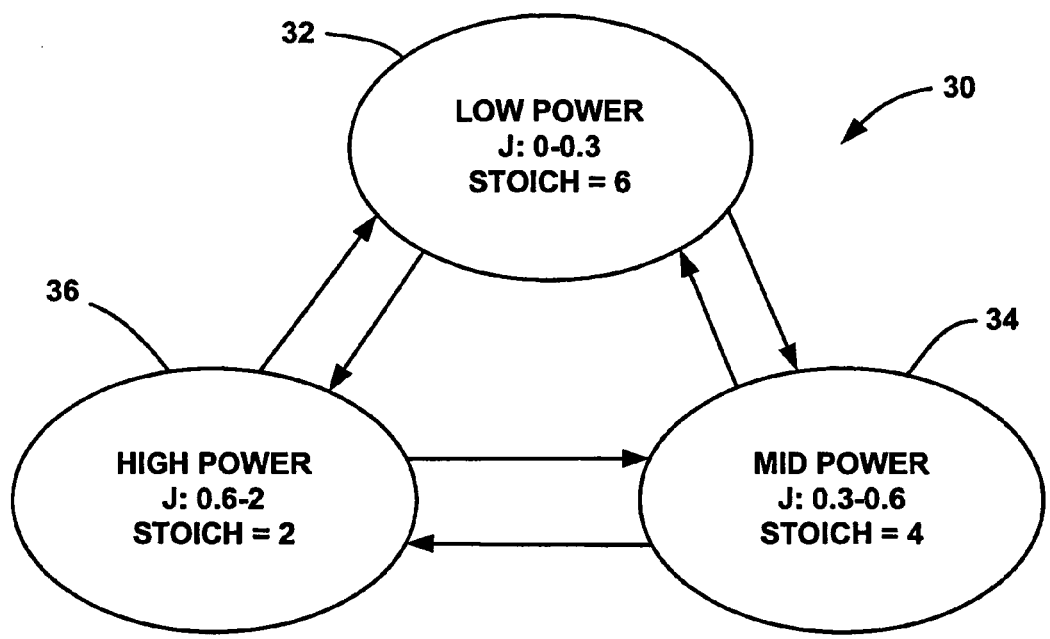
FIG. 3 is a flow chart diagram showing a method for controlling cathode stoichiometry at various fuel cell stack currents densities, according to an embodiment of the present invention.

FIG. 3 is a flow chart diagram 30 illustrating dynamic control of cathode stoichiometry relative to stack power (current density) and time, as discussed above. At a low power position 32, the stack 22 is at a sustained current density J in the range of 0-0.3 A/cm$^2$, and the cathode stoichiometry is 6. At a mid-power position 34, the stack 22 is at a sustained current density J in the range of 0.3-0.6 A/cm$^2$, and the cathode stoichiometry is 4. At a high power position 36, the stack 22 is at sustained current density J in the range of 0.6-2 A/cm$^2$, and the cathode stoichiometry is 2. These current densities and cathode stoichiometries are merely exemplary in that for other applications other current densities and stoichiometry values can be used within the scope of the present invention.

If the current density is at the lower power position 32, and the current density is increased to the mid-power position 34, the controller 26 waits for a predetermined period of time before decreasing the cathode stoichiometry from 6 to 4. In one non-limiting embodiment, this period of time is about 30 seconds. This time period will be calibrated for different systems. Likewise, if the current density generated by the stack 22 goes from the mid-power position 34 to the low power position 32, the controller 26 will maintain the stoichiometry at 4 for the predetermined period of time.

The same logic applies if the current density of the stack 22 transitions between the mid-power position 34 and the high power position 36. Particularly, if the current density goes from the mid-power position 34 to the high power position 36, the controller 26 will wait a predetermined period of time before changing the cathode stoichiometry from 4 to 2, and vice versa. Further, current density transitions between the low power position 32 and the high power position 36 will follow the same logic, where the transition from one stoichiometry to the other will not be made until the change in current density is sustained for a predetermined period of time. Therefore, by not changing the cathode stoichiometry unless the current density of the stack 22 is reduced or increased for a sustained period of time, changes in the relative humidity of the membranes within the fuel cells can be reduced.

Also, it may not be possible for the compressor 24 to maintain the stoichiometry when going from a low power condition to a high power condition because of compressor limitations. For example, if the current density goes from the low-power position 32 to the mid-power position 34, the discussion above requires the controller 26 to maintain the cathode stoichiometry at 6 for a predetermined period of time while the stack 22 is at mid-power. However, a cathode stoichiometry of 6 at mid-power requires significantly more airflow than a cathode stoichiometry of 6 at low power. Therefore, the compressor 24 may not be able to provide this amount of airflow for the predetermined period of time. In this case, the compressor 24 provides a maximum airflow that gives the maximum cathode stoichiometry for the time period. The same logic applies when going from the low power position 32 to the high power position 36 and going from the mid-power position 34 to the high power position 36.

Figure 4:
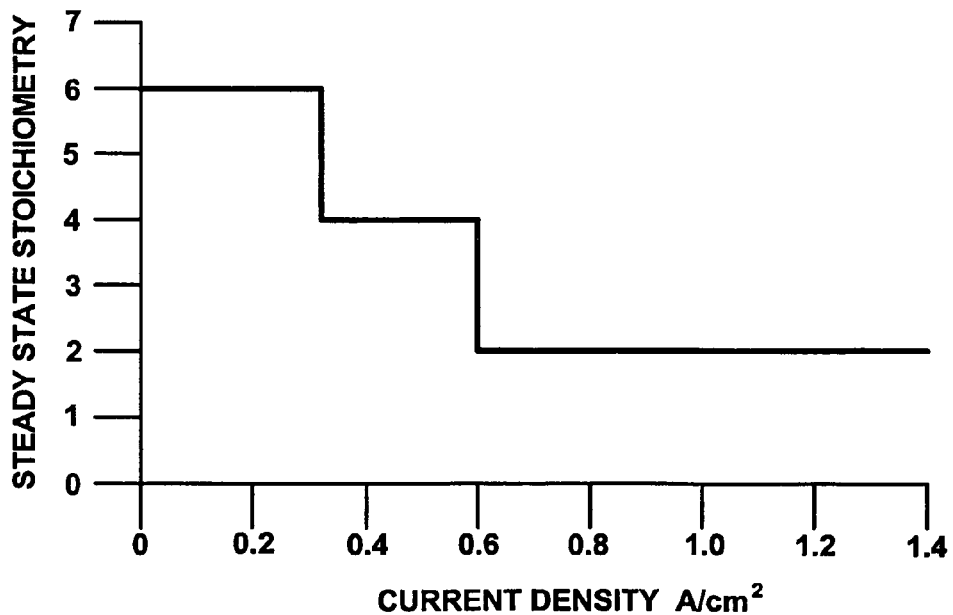
FIG. 4 is a graph with current density on the horizontal axis and cathode stoichiometry on the vertical axis showing cathode stoichiometries for different stack current densities, according to the invention.

FIG. 4 is a graph with current density on the horizontal axis and steady-state stoichiometry on the vertical axis showing the three cathode stoichiometries of 2, 4 and 6 for the current density ranges discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the cathode stoichiometry of a fuel cell stack, said method comprising:

monitoring the current density generated by the fuel cell stack;

monitoring time if the current density goes above or below a predetermined range;

maintaining the cathode stoichiometry constant for a predetermined period of time after the current density goes below the predetermined range; and increasing the cathode stoichiometry after the predetermined period of time that the current density has remained below the predetermined range so as to compensate for any mismatch in thermal dynamics caused by the change in current density.

2. The method according to claim 1 wherein the predetermined period of time is about 30 seconds.

3. The method according to claim 1 wherein increasing the cathode stoichiometry includes increasing the cathode stoichiometry to about 6.

4. A method for controlling the cathode stoichiometry of fuel cell stack, said method comprising:

defining different operating ranges of the current density generated by the fuel cell stack;

identifying a desired cathode stoichiometry for each of the low power range, the mid-power range and the high power range;

determining which range the current density generated by the stack is in;

determining that the current density generated by the stack has changed from one range to another range for an extended period of time; and maintaining the cathode stoichiometry for the one range for a predetermined period of time after the current density generated by the stack has changed to the other range.

5. The method according to claim 4 wherein defining different operating ranges includes defining a low power range, a mid-power range and a high power range.

6. The method according to claim 5 wherein the low power range is 0-0.3 $A/cm^2$, the mid-power range is 0.3-0.6 $A/cm^2$ and the high power range is 0.6-2 $A/cm^2$.

7. The method according to claim 5 wherein the cathode stoichiometry for the low power range is about 6, the cathode stoichiometry for the mid-power range is about 4 and the cathode stoichiometry for the high power range is about 2.

8. The method according to claim 4 wherein the predetermined period of time is about 30 seconds.

9. The method according to claim 4 wherein maintaining the cathode stoichiometry includes maintaining a maximum cathode stoichiometry based on compressor limitations when the current density of the stack goes from a lower current density range to a higher current density range.

10. A fuel cell system comprising:

a fuel cell stack generating a current density;

a compressor for providing an airflow to the fuel cell stack; and a controller for controlling the compressor for providing a desirable cathode stoichiometry, said controller determining that the current density generated by the stack has changed from one current density range to another current density range, maintaining the cathode stoichiometry that is desirable for the one range for a predetermined period of time after the current density generated by the stack has changed to the other range, and then increasing or decreasing the cathode stoichiometry to a desirable value for the other range so as to compensate for any mismatch in thermal dynamics caused by the change in current density.

11. The system according to claim 10 wherein the predetermined period of time is about 30 seconds.

12. The system according to claim 10 wherein the controller maintains a maximum cathode stoichiometry based on compressor limitations when the current density of the stack goes from a lower current density range to a higher current density range.

13. The system according to claim 9 wherein the fuel cell system is on a vehicle.

14. A fuel cell system comprising:

a fuel cell stack generating a current density;

a compressor for providing an airflow to the fuel cell stack; and a controller for controlling the compressor for providing a desirable cathode stoichiometry, wherein the controller defines a low power range, a mid-power range and a high power range of the current density generated by the fuel cell stack and identifies a desirable cathode stoichiometry for each of the low power range, the mid-power range and the high power range, said controller determining which range the current density generated by the stack is currently operating in, determining that the current density generated by the stack has changed from one range to another range, and maintaining the cathode stoichiometry of the one range for a predetermined period of time after the current density generated by the stack has changed to the other range.

15. The system according to claim 14 wherein the low power range is 0-0.3 $A/cm^2$, the mid-power range is 0.3-0.6 $A/cm^2$ and the high power range is 0.6-2 $A/cm^2$.

16. The system according to claim 14 wherein the cathode stoichiometry for the low power range is about 6, the cathode stoichiometry for the mid-power range is about 4 and the cathode stoichiometry for the high power range is about 2.

17. The system according to claim 14 wherein the predetermined period of time is about 30 seconds.

18. The system according to claim 14 wherein the controller maintains a maximum cathode stoichiometry based on compressor limitations when the current density of the stack goes from a lower current density range to a higher current density range.

19. The system according to claim 14 wherein the fuel cell system is on a vehicle.

* * * * *